(12) United States Patent
Williams et al.

(10) Patent No.: US 6,497,279 B1
(45) Date of Patent: Dec. 24, 2002

(54) METHOD OF USING A HEATER WITH A FIBER OPTIC STRING IN A WELLBORE

(75) Inventors: Glynn R Williams, Andover (GB); David H Neuroth, Claremore, OK (US); Larry V Dalrymple, Claremore, OK (US)

(73) Assignee: Sensor Highway Limited, Andover (GB)

( * ) Notice: Subject to any disclaimer, the term of this patent is extended or adjusted under 35 U.S.C. 154(b) by 0 days.

(21) Appl. No.: 09/763,543

(22) PCT Filed: Aug. 25, 1999

(86) PCT No.: PCT/US99/19781

§ 371 (c)(1),
(2), (4) Date: May 22, 2001

(87) PCT Pub. No.: WO00/11317

PCT Pub. Date: Mar. 2, 2000

Related U.S. Application Data

(60) Provisional application No. 60/097,783, filed on Aug. 25, 1998.

(51) Int. Cl.[7] .......................... E21B 47/00; E21B 36/02; E21B 47/06
(52) U.S. Cl. ...................... 166/250.01; 166/60; 166/66; 166/302; 73/152.33; 73/152.13
(58) Field of Search ................... 166/250.01, 250.15, 166/302, 60, 66; 73/152.12, 152.13, 152.33

(56) References Cited

U.S. PATENT DOCUMENTS

| | | | | |
|---|---|---|---|---|
| 4,296,318 A | * | 10/1981 | Mezzetti et al. ............ 250/225 |
| 4,435,978 A | * | 3/1984 | Glatz ..................... 166/250.01 |
| 4,570,715 A | * | 2/1986 | Van Meurs et al. ......... 166/302 |
| 4,616,705 A | * | 10/1986 | Stegemeier et al. ... 166/250.01 |
| 4,621,929 A | * | 11/1986 | Phillips ........................ 356/44 |
| 4,832,121 A | * | 5/1989 | Anderson .............. 166/250.09 |
| 4,947,682 A | * | 8/1990 | Anderson et al. ............. 374/10 |
| 5,509,474 A | * | 4/1996 | Cooke, Jr. ............. 166/250.01 |
| 5,551,287 A | * | 9/1996 | Maute et al. .......... 166/250.01 |
| 5,582,064 A | * | 12/1996 | Kluth .......................... 166/66 |
| 5,782,301 A | * | 7/1998 | Neuroth et al. ............. 166/302 |

FOREIGN PATENT DOCUMENTS

| WO | WO 96/09461 | * | 3/1996 |
|---|---|---|---|
| WO | WO 99/45235 | * | 9/1999 |

* cited by examiner

*Primary Examiner*—Hoang Dang
(74) *Attorney, Agent, or Firm*—Robert W J Usher

(57) ABSTRACT

The present invention provides a heater cable (10) that may be deployed in a wellbore to elevate the temperature of the wellbore above the temperature of the surrounding fluid and the formation. One or more fiber optic strings are included in or are carried by the heater cable. The heater cable carrying the fiber optics is placed along the desired length of the wellbore. At least one fiber optic string measures temperature of the heater cable at a plurality of spaced apart locations. Another string may be utilized to determine the temperature of the wellbore. In one aspect of this invention, the heater cable is heated above the temperature of the wellbore. The fluid flowing from the formation to the wellbore lowers the temperature of the cable at the inflow locations. The fiber optic string provides measurements of the temperature along the heater cable. The fluid flow is determined from the temperature profile of the heater cable provided by the fiber optic sensors.

5 Claims, 2 Drawing Sheets

METHOD OF USING A HEATER WITH A FIBER OPTIC STRING IN A WELLBORE

This is a 371 of PCT International Application No. PCT/US99/19781 filed Aug. 25, 1999, which claims priority to U.S. Provisional Application Serial No. 60/097,783, filed Aug. 25, 1998.

FIELD OF THE INVENTION

This invention relates to utilizing fiber optic sensor strings with heater cables for use in oil wells and more particularly for determining the flow of formation fluid into the wellbore and to control the operation of the heater cables for optimum operations.

BACKGROUND OF THE ART

Heater cables are often used in wellbores to increase the temperature of the fluid in the wellbore to prevent the formation of paraffins and to prevent the oil from flocculating. Such phenomena cause at least some of the oil to become highly viscous, and often plugs the perforations. Such fluids can clog the electrical submersible pumps. Heater cables are also used to heat the formation surrounding the wellbores which contain heavy (highly viscous) oil to reduce the viscosity of such oil.

The heater cable usually is a resistance heating element. High current supplied from the surface can heat the cable to a temperature substantially higher than the formation temperature. In ESP applications, a heater current may be deployed below the ESP. In other production wells, heater cable may be installed along any desired portion or segment of the wells. It is desirable to determine the fluid flow from various production zones along a wellbore and to monitor and control the temperature of the heater cable so as to heat the wellbore only as required for optimum recovery and to reduce power consumption.

U.S. Pat. No. 4,435,978 discloses a hot wire anemometer in which heat is supplied at a constant rate to a sensor element with fluid flowing past the element. The drop in temperature of the sensor element is used to give a measurement of the fluid flow. This method accurately measures the flow under a variety of flow conditions.

U.S. Pat. No. 5,551,287 discloses a wireline device in which a hot film anemometer deployed on sensor pads measures the temperature of fluid entering the borehole. The fluid flowing past the sensor element produces a change in resistance that is used in a bridge circuit to give a measurement of temperature. This temperature measurement, when combined with a measurement of local ambient temperature, gives an indication of the rate of fluid flow into the borehole. U.S. Pat. No. 4,621,929 discloses a fiber optic thermal anemometer using a sensor element with temperature sensitive optical properties.

The present invention is an apparatus and method for monitoring the fluid flow from a producing well with a plurality of producing intervals. A cable that includes a number of fiber optic thermal anemometer sensors is deployed in the producing well with the sensors in the vicinity of the perforations in the casing or inlets from which fluid from the reservoirs enters the production casing. The present invention also provides temperature distribution along the heater cable length which information is utilized to control the operation of the heater cable.

SUMMARY OF THE INVENTION

The present invention provides a heater cable that may be deployed in a wellbore to elevate the temperature of the wellbore above the temperature of the surrounding fluid and the formation. One or more fiber optic strings are included in or are carried by the heater cable. The heater cable carrying the fiber optics is placed along the desired length of the wellbore. At least one fiber optic string measures temperature of the heater cable at a plurality of spaced apart locations. Another string may be utilized to determine the temperature of the wellbore. In one aspect of this invention, the heater cable is heated above the temperature of the wellbore. The fluid flowing from the formation to the wellbore lowers the temperature of the cable at the inflow locations. The fiber optic string provides measurements of the temperature along the heater cable. The fluid flow is determined from the temperature profile of the heater cable provided by the fiber optic sensors. In another aspect of this invention, the temperature distribution along the heater cable is used to control the operation of the heater cable to maintain the elevated temperature within desired limits. The heater cable may be selected turned on and turned off to provide only the desired amount of heat. This may be accomplished by selectively turning on and turning off the heater cable or by increasing and decreasing the electric power supplied as a function of the downhole measured temperatures.

BRIEF DESCRIPTION OF THE DRAWINGS

For detailed understanding of the present invention, references should be made to the following detailed description of the preferred embodiment, taken in conjunction with the accompanying drawings, in which like elements have been given like numerals, wherein.

DETAILED DESCRIPTION OF THE PREFERRED EMBODIMENTS

Figure 1A:
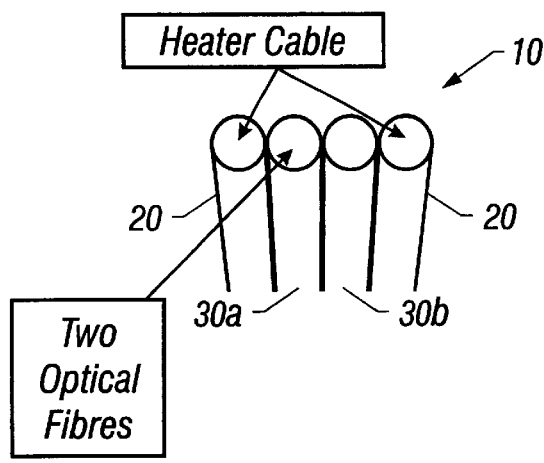
FIG. 1A shows a portion of a heater cable carrying fiber optic strings according to the present invention.
Figure 1B:
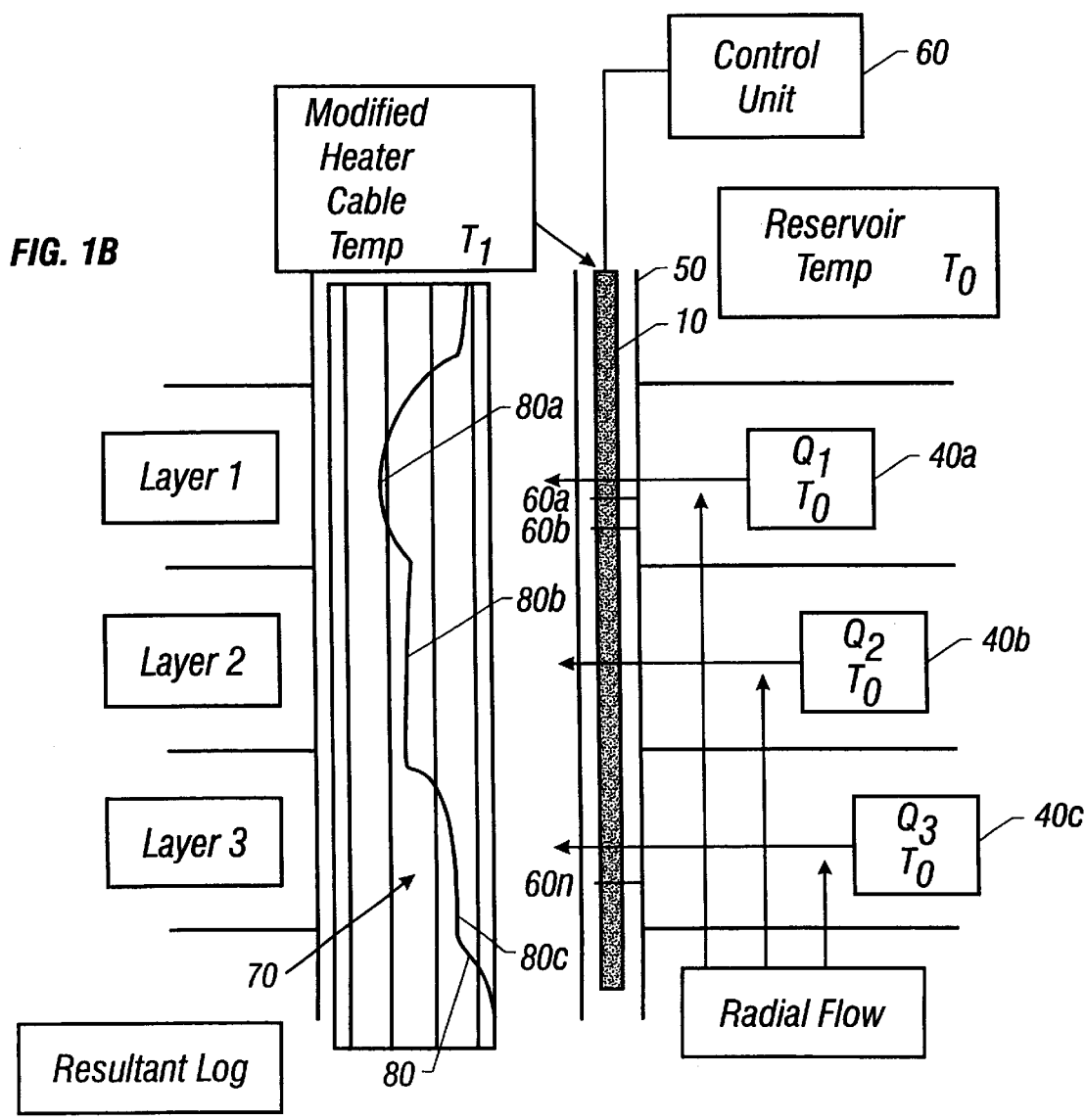
FIG. 1B shows the cable of FIG. 1A deployed in a producing borehole that penetrates a number of reservoirs.

FIG. 1A shows a portion of a cable 10 according to one embodiment of the present invention. It includes a heater cable 20 that carries electrical current and is used as a source of heat by means of uniformly dispersed resistive elements within a portion of the cable (not shown). The cable also includes a pair of fibers 30a, 30b for carrying optical signals down the borehole and back up the borehole and for measuring temperature at spaced locations along the fibers. FIG. 1B shows the cable 10 deployed in a producing borehole 50 that penetrates a number of reservoirs. For illustrative purposes, three producing intervals 40a, 40b and 40c are shown. For illustrative purposes only, each of the three producing intervals is assumed to have a uniform temperature of $T_0$. Further, each of the three producing intervals has a different rate of flow, denoted by $Q_1, Q_2, Q_3$, of reservoir fluid into the producing well 50. A plurality of fiber optic sensors, 60a, 60b, 60c . . . 60n in the cable 10 make continuous measurements of temperature at the respective locations. To determine the flow rate from the various zones Q1–Q3, a control unit 60 provides power to the heater cable 20, to cause it to heat the wellbore 50 to a temperature T1 that is significantly higher than To. The fluid flowing from the zones 40a–40e, which causes the temperature of the heater cable 20 to drop at the flow locations. Under these conditions, the greater the flow rate of fluid $Q_i$ past a sensor, the greater the temperature of the sensor will drop from $T_1$ towards $T_0$. Measurements of temperature of the sensor are used as an indication of the flow of the formation fluid into the wellbore 50.

The control unit 60 receives the signals from the fiber optic strings 30a–30b and can be programmed to calculate the fluid flow from each zone. A log such as shown by the resultant log 70 may be continuously displayed and recorded by the control unit 60. The log 70 shows a temperature profile along the well 50. An example of the affect on the temperature curve 80 of the flow from zones Q1–Q3 respectively is shown at locations 80a–80c.

Figure 2:
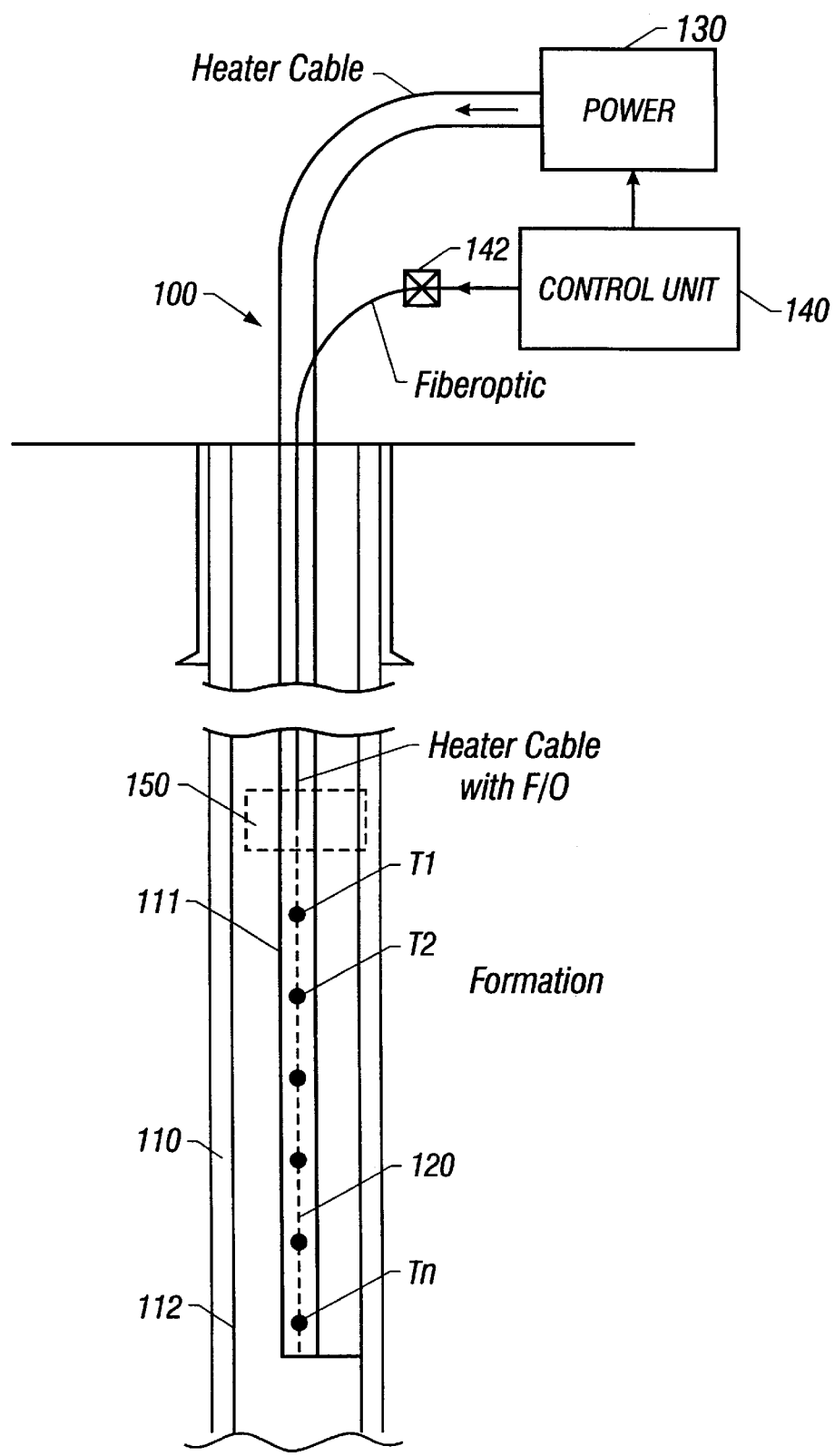
FIG. 2 shows a heater cable deployed in a wellbore being controlled by a control unit as a function of the temperature measurements provided by the fiber optic sensors in the cable.

FIG. 2 shows a heater cable 100 made according to the present invention, deployed or placed in a well bore 110 having a casing 112. The cable 100 includes one or more fiber optic string 120 adapted to measure temperature at spaced apart locations T1–Tn along a segment or portion of the cable 100 shown by the dotted line. The heater cable 100 is adapted to heat any desired segment of the cable. For convenience, the heater cable herein is assumed to carry heating elements that heat the segment from T1–Tn. A power unit 130 supplies power to the heating element 111. A control unit 140 controls the power unit 130, and an optical energy and data unit 142.

The heater element 111 is heated to a predetermined temperature to enhance production flow to the surface. The fiber optic string continuously provides the temperature profile along the wellbore via sensor T1–Tn. If the temperature of the cable 100 in the wellbore is outside a predetermined norm, the control unit 140 adjusts the power to the cable 100 until the heater cable temperature provided by T1–Tn falls back in the desired limits. The control unit may be programmed to selectively turn on and turn off the heater cable to optimize the power consumption and to enhance the operating life of the heater cable.

The heater cable 100 may be deployed below an electrical submersible pump (ESP) when used as shown in FIG. 2 and also above the ESP. The temperature distribution T1–Tn along the heater cable is also useful in predicting heater cable 100 failures. It provides indication of hot spots in the heater cable and the efficiency of the cable corresponding to the input power.

Since the current supplied to the heater element 111 is the same, the heat generated by a uniform heater element will be uniform. The temperature distribution T1–Tn can thus provide indication of the quality of the heater cable's 110 performance.

While the foregoing disclosure is directed to the preferred embodiments of the invention, various modifications will be apparent to those skilled in the art. It is intended that all variations within the scope and spirit of the appended claims be embraced by the foregoing disclosure.

What is claimed is:

1. A method of determining flow of fluid from a formation into a wellbore, comprising:

providing a heater cable with a fiber optic string adapted to measure temperature at selected spaced apart locations along said heater cable;

placing said heater cable along a segment of said wellbore that is receiving fluid from adjacent formation;

heating the heater cable to a temperature above the temperature of the wellbore at said selected segment;

measuring a temperature profile along said heater cable by said fiber optic string; and determining from said temperature profile flow of fluid from said formation into the wellbore.

2. The method of claim 1 further comprising:

providing a control unit at the surface for receiving temperature measurements from said fiber optic string.

3. The method of claim 2 further comprising:

providing a temperature log of said wellbore from said temperature measurements.

4. A method of controlling the operation of a heater cable deployed in a wellbore, said heater cable heating a segment of said wellbore to enhance production of fluids through the wellbore, said method comprising:

providing a heater cable with a fiber optic string adapted to measure temperatures at spaced apart locations along said heater cable;

deploying said heater cable at a selected location in said wellbore;

providing power to said heater cable to heat the wellbore to a first temperature;

measuring temperature at selected locations by the fiber optic string; and adjusting the power to the heater cable as a function of the temperature measurements.

5. The method of claim 4 further comprising providing a control unit at the surface, said control unit controlling the supply of power to the heater cable as a function of the temperature measurements.

* * * * *